US009011812B2

(12) United States Patent
Brausch et al.

(10) Patent No.: US 9,011,812 B2
(45) Date of Patent: Apr. 21, 2015

(54) PROCESS FOR PREPARING HYDRIDOSILANES

(75) Inventors: Nicole Brausch, Essen (DE); Jens Haubrock, Duelmen (DE); Udo Knippenberg, Marl, DE (US); Thorsten Schwaertzke, Marl (DE); Joerg Zoellner, Recklinghausen (DE); Stephan Wieber, Karlsruhe (DE)

(73) Assignee: Evonik Degussa GmbH, Essen (DE)

( * ) Notice: Subject to any disclaimer, the term of this patent is extended or adjusted under 35 U.S.C. 154(b) by 43 days.

(21) Appl. No.: 13/991,986

(22) PCT Filed: Dec. 20, 2011

(86) PCT No.: PCT/EP2011/073337
§ 371 (c)(1),
(2), (4) Date: Jun. 6, 2013

(87) PCT Pub. No.: WO2012/084897
PCT Pub. Date: Jun. 28, 2012

(65) Prior Publication Data
US 2013/0259791 A1    Oct. 3, 2013

(30) Foreign Application Priority Data
Dec. 22, 2010   (DE) .......................... 10 2010 063 823

(51) Int. Cl.
*C01B 33/04* (2006.01)
*C01B 33/107* (2006.01)

(52) U.S. Cl.
CPC .............. *C01B 33/107* (2013.01); *C01B 33/04* (2013.01); *C01B 33/1071* (2013.01); *C01B 33/10773* (2013.01); *C01B 33/10705* (2013.01); *C01B 33/10768* (2013.01)

(58) Field of Classification Search
USPC .................................. 423/347, 341, 342, 344
See application file for complete search history.

(56) References Cited

U.S. PATENT DOCUMENTS

| 2008/0319214 A1 | 12/2008 | Geisberger et al. |
| 2010/0176338 A1 | 7/2010 | Cannady et al. |
| 2011/0189072 A1 | 8/2011 | Brausch et al. |
| 2011/0268642 A1 | 11/2011 | Brausch et al. |
| 2012/0205654 A1 | 8/2012 | Stuetzel et al. |
| 2012/0214005 A1 | 8/2012 | Wieber et al. |
| 2012/0263639 A1 | 10/2012 | Brausch et al. |
| 2012/0273805 A1 | 11/2012 | Wieber et al. |
| 2012/0291665 A1 | 11/2012 | Wieber et al. |
| 2013/0168824 A1 | 7/2013 | Wieber et al. |

FOREIGN PATENT DOCUMENTS

| EP | 2 006 250 | 12/2008 |
| GB | 2 077 710 | 12/1981 |
| WO | 2008 051328 | 5/2008 |
| WO | 2011 061088 | 5/2011 |
| WO | 2012 028476 | 3/2012 |
| WO | 2012 041837 | 4/2012 |
| WO | 2012 055693 | 5/2012 |
| WO | 2012 072401 | 6/2012 |
| WO | 2012 072403 | 6/2012 |
| WO | 2012 072406 | 6/2012 |
| WO | 2012 080003 | 6/2012 |
| WO | 2012 130620 | 10/2012 |

OTHER PUBLICATIONS

International Search Report Issued May 4, 2012 in PCT/EP11/73337 Filed Dec. 20, 2011.
U.S. Appl. No. 13/989,823, filed May 28, 2013, Wieber, et al.
U.S. Appl. No. 13/824,641, filed Mar. 18, 2013, Wieber, et al.
U.S. Appl. No. 13/991,261, filed Jun. 3, 2013, Stenner, et al.
U.S. Appl. No. 13/885,316, filed May 14, 2013, Stenner, et al.

*Primary Examiner* — Edward Johnson
(74) *Attorney, Agent, or Firm* — Oblon, McClelland, Maier & Neustadt, L.L.P.

(57) ABSTRACT

The present invention relates to a process for preparing hydridosilanes from halosilanes, in which a) i) at least one halosilane of the generic formula $Si_nX_{2n+2}$ (where $n \geq 3$ and X=F, Cl, Br and/or I) and ii) at least one catalyst are converted to form a mixture comprising at least one halosilane of the generic formula $Si_mX_{2m+2}$ (where m>n and X=F, Cl, Br and/or I) and $SiX_4$ (where X=F, Cl, Br and/or I), and b) the at least one halosilane of the generic formula $Si_mX_{2m+2}$ is hydrogenated to form a hydridosilane of the generic formula $Si_mH_{2m+2}$, the hydridosilane of the generic formula $Si_mH_{2m+2}$ is separated from partially halogenated hydridosilanes of the general formula $Si_mH_{(2m+2-y)}X_y$ (where $1<y<2m+1$), and the separated partially halogenated hydridosilanes of the general formula $Si_mH_{(2m+2-y)}X_y$ (where $1<y<2m+1$) are hydrogenated again.

10 Claims, No Drawings

PROCESS FOR PREPARING HYDRIDOSILANES

This application is a National Stage of PCT/EP11/73337 filed Dec. 20, 2011 and claims the benefit of DE 10 2010 063 823.4 filed Dec. 22, 2010.

The invention relates to a process for preparing hydridosilanes from halosilanes.

Hydridosilanes and mixtures thereof are described in the literature as possible reactants for the generation of silicon layers. Hydridosilanes are understood to mean compounds which contain essentially only silicon and hydrogen atoms. Hydridosilanes may be gaseous, liquid or solid and are—in the case of solids—essentially soluble in solvents such as toluene or cyclohexane, or in liquid silanes such as cyclopentasilane. Examples include monosilane, disilane, trisilane, cyclopentasilane and neopentasilane. Hydridosilanes having at least three or four silicon atoms may have a linear, branched or (optionally bi-/poly-)cyclic structure with Si—H bonds, and can be described by the particular generic formulae $Si_nH_{2n+2}$ (linear or branched; where $n \geq 2$), $Si_nH_{2n}$ (cyclic; where $n \geq 3$) or $Si_nH_{2(n-i)}$ (bi- or polycyclic; $n \geq 4$; i={number of cycles}-1).

Many processes for preparing hydridosilanes are based on a dehydropolymerization reaction of lower hydridosilanes, especially $SiH_4$, to higher silanes with formal $H_2$ elimination. The dehydropolymerization reaction can be performed 1) thermally (U.S. Pat. No. 6,027,705 A in the case that no catalyst is used) and/or 2) by using catalysts such as a) elemental transition metals (heterogeneous catalysis; U.S. Pat. No. 6,027,705 A in the case that platinum group metals, i.e. Ru, Rh, Pd, Os, Ir, Pt, are used; U.S. Pat. No. 5,700,400 A for metals of groups 3B-7B and 8—i.e. the transition metals/lanthanides except the Cu and Zn groups), b) nonmetal oxides (heterogeneous catalysis; U.S. Pat. No. 6,027,705 A in the case that $Al_2O_3$ or $SiO_2$ is used), c) hydridic cyclopentadienyl complexes of scandium, yttrium or rare earths (homogeneous catalysis; U.S. Pat. No. 4,965,386 A, U.S. Pat. No. 5,252,766 A), d) transition metal complexes (homogeneous catalysis; U.S. Pat. No. 5,700,400 A for complexes of metals of groups 3B-7B and 8—i.e. the transition metals/lanthanides except the Cu and Zn groups; JP 02-184513 A) or e) particular transition metals immobilized on a support (heterogeneous catalysis; U.S. Pat. No. 6,027,705 A in the case that platinum group metals on a support, for example $SiO_2$, are used, U.S. Pat. No. 5,700,400 A for ruthenium, rhodium, palladium or platinum immobilized on carbon, $SiO_2$ or $Al_2O_3$) or transition metal complexes (heterogeneous catalysis, U.S. Pat. No. 6,027,705 A in the case that platinum group metal complexes on a support, for example $SiO_2$, are used). However, all these processes have the disadvantage that the lower hydridosilanes used themselves first have to be prepared in a complicated manner. A further disadvantage of these processes is that they require a high level of apparatus complexity owing to the self-ignitability of the reactants. Finally, it has not been possible to date to achieve sufficiently high yields with these processes. Furthermore, complex purification is required.

Another process for preparing hydridosilanes, in which dihalosilanes are converted by an electrochemical route, optionally together with trihalosilanes and/or tetrahalosilanes, is described, for example, by EP 0 673 960 A1. This process too, however, has the disadvantage that, owing to the electrochemical reaction regime, it requires a high level of apparatus complexity and additionally high energy densities. Finally, the particular di- or trihalosilanes first have to be prepared in a complex manner beforehand here too.

Alternatively, it is also possible to prepare higher hydridosilanes by dehalogenation and polycondensation of halosilanes with alkali metals (GB 2 077 710 A). However, this process does not lead to sufficiently high yields either. Moreover, this process is not very selective.

A. Kaczmarczyk et al., J. Inorg. Nucl. Chem., 1964, Vol. 26, 421-425 and G. Urry, J. Inorg. Nucl. Chem., 1964, Vol. 26, 409-414 teach the catalytic formation of higher chlorosilanes from lower chlorosilanes, especially the formation of pentasilicon dodecachloride (the chlorine analogue of neopentasilane, $Si(SiH_3)_4$). For instance, A. Kaczmarczyk et al., J. Inorg. Nucl. Chem., 1964, Vol. 26, 421-425 teaches the synthesis of pentasilicon dodecachloride from hexachlorodisilane to form tetrachlorosilane. It is additionally stated there that an appropriate starting amount of octachlorotrisilane gives rise to pentasilicon dodecachloride and hexachlorodisilane. The catalyst used there is trimethylamine. G. Urry, J. Inorg. Nucl. Chem., 1964, Vol. 26, 409-414 teaches the trimethylamine-catalysed synthesis of pentasilicon dodecachloride from hexachlorodisilane to form tetrachlorosilane, or from octachlorotrisilane to form hexachlorodisilane. The hydrogenation of the products to hydridosilanes is not described therein. Moreover, these processes do not achieve satisfactory yields of higher perchlorosilanes. Furthermore, it is disadvantageous in the synthesis variant using octachlorotrisilane that the hexachlorodisilane by-product which forms, in contrast to the tetrachlorosilane which forms in the process variant based on hexachlorodisilane, is not volatile at room temperature and standard pressure, and is therefore not drawn off but has to be distilled off in a complex manner.

WO 2008/051328 A1 teaches obtaining neopentasilane-containing compositions by reacting a hexahalodisilane of the formula $X_3SiSiX_3$ with a tertiary amine catalyst to form a first mixture comprising tetrakis(trihalosilyl)silane (Si $(SiX_3)_4$) and tetrahalosilane. The two main constituents, tetrakis(trihalosilyl)silane and tetrahalosilane, can be separated from one another. The tetrakis(trihalosilyl)silane obtained can be converted by hydrogenation with diisobutylaluminium hydride to neopentasilane ($Si(SiH_3)_4$). This process too, though, still does not lead to satisfactory yields owing to the reaction equation (4 $Si_2Cl_6 \rightarrow Si_5Cl_{12} + 3\ SiCl_4$).

DE 10 2009 053 804 describes a process for preparing hydridosilanes in relatively high yield, especially neopentasilane. In this process, a) i) at least one halosilane of the generic formula $Si_nX_{2n+2}$ (where $n \geq 3$ and $X = F$, Cl, Br and/or I) and
ii) at least one catalyst of the generic formula $NRR'_aR''_bY_c$ where $a = 0$ or 1, $b = 0$ or 1, and $c = 0$ or 1, and Y = 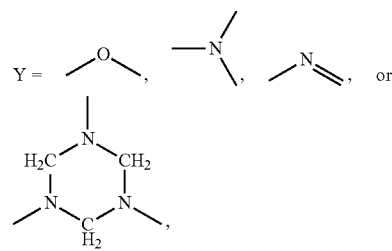

where
aa) R, R' and/or R" are each —$C_1$-$C_{12}$-alkyl, —$C_1$-$C_{12}$-aryl, —$C_1$-$C_{12}$-aralkyl, —$C_1$-$C_{12}$-aminoalkyl, —$C_1$-$C_{12}$-aminoaryl, —$C_1$-$C_{12}$-aminoaralkyl, especially preferably -Ph, -PhCH$_3$, -PhC$_2$H$_5$, -PhC$_3$H$_7$, —CH$_2$(C$_6$H$_4$)CH$_3$, —CH$_2$(C$_6$H$_4$)C$_2$H$_5$, —C$_2$H$_4$(C$_6$H$_4$)C$_2$H$_5$, —C$_2$H$_4$(C$_6$H$_4$)C$_3$H$_7$, —C$_3$H$_6$(C$_6$H$_4$)—C$_3$H$_7$, —C$_6$H$_2$(CH$_3$)$_3$, —C$_6$H$_3$(CH$_3$)$_2$, —C$_8$H$_7$, —C$_8$H$_6$CH$_3$, -PhNR'''R'''', -PhCH$_2$NR'''R'''', -PhC$_2$H$_4$NR'''R'''', -PhC$_3$H$_6$NR'''R'''', —CH$_2$(C$_6$H$_4$)CH$_2$NR'''R'''', —CH$_2$(C$_6$H$_4$)C$_2$H$_4$—NR'''R'''', —C$_2$H$_4$(C$_6$H$_4$)C$_2$H$_4$NR'''R'''', —C$_2$H$_4$(C$_6$H$_4$)C$_3$H$_6$NR'''R'''', —C$_3$H$_6$(C$_6$H$_4$)C$_3$H$_6$NR'''R'''', —CH$_2$NR'''R'''', —C$_2$H$_4$NR'''R'''', —C$_3$H$_6$NR'''R'''', —C$_4$H$_8$NR'''R'''', —C$_5$H$_{10}$NR'''R'''', —C$_6$H$_{12}$NR'''R'''', —C$_7$H$_{14}$NR'''R'''', —C$_8$H$_{16}$NR'''R'''', —C$_9$H$_{18}$NR'''R'''' and/or —C$_{10}$H$_{20}$NR'''R'''' (where R''' and R''''=—C$_1$-C$_{10}$-alkyl, —C$_1$-C$_{10}$-aryl and/or —C$_1$-C$_{10}$-aralkyl), and/or two or three R, R' and R'' radicals in the case that c=0 together form a cyclic or bicyclic, heteroaliphatic or heteroaromatic system including N,
the cyclic or bicyclic, heteroaliphatic or heteroaromatic system especially preferably being a pyrrolidine, pyrrole, piperidine, pyridine, hexamethyleneimine, azatropylidene or a quinoline ring system,
with the proviso that at least one R, R' or R'' radical is not —CH$_3$ and/or bb) R and R' and/or R'' (in the case that c=1) are each —C$_1$-C$_{12}$-alkylene, —C$_1$-C$_{12}$-arylene, —C$_1$-C$_{12}$-aralkylene, —C$_1$-C$_{12}$-heteroalkylene, —C$_1$-C$_{12}$-heteroarylene, —C$_1$-C$_{12}$-heteroaralkylene and/or —N=,
especially preferably —CH$_2$—, —C$_2$H$_4$—, —C$_3$H$_6$—, —C$_4$H$_8$—, —C$_5$H$_{10}$—, —C$_6$H$_{12}$—, —C$_7$H$_{14}$—, —C$_8$H$_{16}$—, —C$_9$H$_{18}$—, —C$_{10}$H$_{20}$—, -Ph-, -PhCH$_2$—, -PhC$_2$H$_4$—, -PhC$_3$H$_6$—, —CH$_2$(C$_6$H$_4$)CH$_2$—, —CH$_2$(C$_6$H$_4$)C$_2$H$_4$—, —C$_2$H$_4$(C$_6$H$_4$)C$_2$H$_4$—, —C$_2$H$_4$(C$_6$H$_4$)C$_3$H$_6$—, —C$_3$H$_6$(C$_6$H$_4$)C$_3$H$_6$—, —C$_6$H(CH$_3$)$_3$—, —C$_6$H$_2$(CH$_3$)$_2$—, —CH=, —CH=CH—, —N=, —N=CH— and/or —CH=N—, or cc) (in the case that a=b=c=0) R===C—R'''(where R'''=—C$_1$-C$_{10}$-alkyl, —C$_1$-C$_{10}$-aryl and/or —C$_1$-C$_{10}$-aralkyl), are converted to form a mixture comprising at least one halosilane of the generic formula Si$_m$X$_{2m+2}$ (where m>n and X=F, Cl, Br and/or I) and SiX$_4$ (where X=F, Cl, Br and/or I), and b) the at least one halosilane of the generic formula Si$_m$X$_{2m+2}$ is hydrogenated to form a hydridosilane of the generic formula Si$_m$H$_{2m+2}$.

A disadvantage of this process is that despite the indication of a primary reaction product of the generic formula Si$_m$H$_{2m+2}$ (where m>3), a mixture of hydridosilanes of this generic formula with partially halogenated hydridosilanes of the generic formula Si$_m$H$_{(2m+2-y)}$X$_y$ (where 1<y<2m+1) is formed. These partially halogenated hydridosilanes are disadvantageous for further processing, especially for the production of silicon-containing layers which are employed preferably in optoelectronics, since residual chlorine fractions in the layer result in diminished electrical properties.

It is the object of the present invention, therefore, to optimize the process described in DE 10 2009 053 804 in such a way that the disadvantages described are avoided.

This object is presently achieved by a process in which
a) i) at least one halosilane of the generic formula Si$_n$X$_{2n+2}$ (where n≥3 and X=F, Cl, Br and/or I) and
ii) at least one catalyst of the generic formula NRR'$_a$R''$_b$Y$_c$ where a=0 or 1, b=0 or 1, and c=0 or 1, and

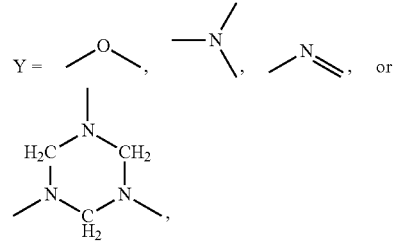

where
aa) R, R' and/or R'' are each —C$_1$-C$_{12}$-alkyl, —C$_1$-C$_{12}$-aryl, —C$_1$-C$_{12}$-aralkyl, —C$_1$-C$_{12}$-aminoalkyl, —C$_1$-C$_{12}$-aminoaryl, —C$_1$-C$_{12}$-aminoaralkyl,
especially preferably -Ph, -PhCH$_3$, -PhC$_2$H$_5$, -PhC$_3$H$_7$, —CH$_2$(C$_6$H$_4$)CH$_3$, —CH$_2$(C$_6$H$_4$)C$_2$H$_5$, —C$_2$H$_4$(C$_6$H$_4$)C$_2$H$_5$, —C$_2$H$_4$(C$_6$H$_4$)C$_3$H$_7$, —C$_3$H$_6$(C$_6$H$_4$)—C$_3$H$_7$, —C$_6$H$_2$(CH$_3$)$_3$, —C$_6$H$_3$(CH$_3$)$_2$, —C$_8$H$_7$, —C$_8$H$_6$CH$_3$, -PhNR'''R'''', -PhCH$_2$NR'''R'''', -PhC$_2$H$_4$NR'''R'''', -PhC$_3$H$_6$NR'''R'''', —CH$_2$(C$_6$H$_4$)CH$_2$NR'''R'''', —CH$_2$(C$_6$H$_4$)C$_2$H$_4$—NR'''R'''', —C$_2$H$_4$(C$_6$H$_4$)C$_2$H$_4$NR'''R'''', —C$_2$H$_4$(C$_6$H$_4$)C$_3$H$_6$NR'''R'''', —C$_3$H$_6$(C$_6$H$_4$)C$_3$H$_6$NR'''R'''', —CH$_2$NR'''R'''', —C$_2$H$_4$NR'''R'''', —C$_3$H$_6$NR'''R'''', —C$_4$H$_8$NR'''R'''', —C$_5$H$_{10}$NR'''R'''', —C$_6$H$_{12}$NR'''R'''', —C$_7$H$_{14}$NR'''R'''', —C$_8$H$_{16}$NR'''R'''', —C$_8$H$_{18}$NR'''R'''' and/or —C$_{10}$H$_{20}$NR'''R'''' (where R''' and R''''=—C$_1$-C$_{10}$-alkyl, —C$_1$-C$_{10}$-aryl and/or —C$_1$-C$_{10}$-aralkyl), and/or two or three R, R' and R'' radicals in the case that c=0 together form a cyclic or bicyclic, heteroaliphatic or heteroaromatic system including N,
the cyclic or bicyclic, heteroaliphatic or heteroaromatic system especially preferably being a pyrrolidine, pyrrole, piperidine, pyridine, hexamethyleneimine, azatropylidene or a quinoline ring system,
with the proviso that at least one R, R' or R'' radical is not —CH$_3$ and/or bb) R and R' and/or R'' (in the case that c=1) are each —C$_1$-C$_{12}$-alkylene, —C$_1$-C$_{12}$-arylene, —C$_1$-C$_{12}$-aralkylene, —C$_1$-C$_{12}$-heteroalkylene, —C$_1$-C$_{12}$-heteroarylene, —C$_1$-C$_{12}$-heteroaralkylene and/or —N=,
especially preferably —CH$_2$—, —C$_2$H$_4$—, —C$_3$H$_6$—, —C$_5$H$_{10}$—, —C$_6$H$_{12}$—, —C$_7$H$_{14}$—, —C$_8$H$_{16}$—, —C$_9$H$_{18}$—, —C$_{10}$H$_2$O—, -Ph-, -PhCH$_2$—, -PhC$_2$H$_4$—, -PhC$_3$H$_6$—, —CH$_2$(C$_6$H$_4$)CH$_2$—, —CH$_2$(C$_6$H$_4$)C$_2$H$_4$—, —C$_2$H$_4$(C$_6$H$_4$)C$_2$H$_4$—, —$C_2H_4(C_6H_4)C_3H_6$—, —$C_3H_6(C_6H_4)C_3H_6$—, —$C_6H(CH_3)_3$—, —$C_6H_2(CH_3)_2$—, —CH=, —CH=CH—, —N=, —N=CH— and/or —CH=N—, or cc) (in the case that a=b=c=0) R==C—R''' (where R'''=—$C_1$-$C_{10}$-alkyl, —$C_1$-$C_{10}$-aryl and/or —$C_1$-$C_{10}$-aralkyl), are converted to form a mixture comprising at least one halosilane of the generic formula $Si_mX_{2m+2}$ (where m>n and X=F, Cl, Br and/or I) and $SiX_4$ (where X=F, Cl, Br and/or I), b) the at least one halosilane of the generic formula $Si_mX_{2m+2}$ is hydrogenated to form a hydridosilane of the generic formula $Si_mH_{2m+2}$, c) the hydridosilane of the generic formula $Si_mH_{2m+2}$ is separated from partially halogenated hydridosilanes of the general formula $Si_mH_{(2m+2-y)}X_y$ (where 1<y<2m+1), and d) optionally, the partially halogenated hydridosilanes of the general formula $Si_mH_{(2m+2-y)}X_y$ (where 1<y<2m+1) separated in step c) are hydrogenated again.

The halosilane used in the process according to the invention is a compound which consists essentially only of silicon atoms and halogen atoms (halogen=fluorine, chlorine, bromine, iodine) and which has at least three silicon atoms. Halosilanes of the generic formula $Si_nX_{2n+2}$ having at least three or four silicon atoms may have a linear or branched structure.

Particularly efficiently usable for the process according to the invention are linear halosilanes.

The at least one halosilane of the generic formula $Si_nX_{2n+2}$ is preferably a compound selected from the group of the octahalotrisilanes or of the decahalotetrasilanes, i.e. the compounds of the generic formula $Si_3X_8$ or $Si_4X_{10}$ where X=F, Cl, Br and/or I, or mixtures of the silanes mentioned.

Very particular preference is given to octahalotrisilanes. Among these compounds, particular preference is given in turn to octafluorotrisilane, octachlorotrisilane, octabromotrisilane and octaiodotrisilane, i.e. the compounds of the generic formula $Si_3X_8$ where X=F, Cl, Br or I. The use of octachlorotrisilane has the advantage in the process according to the invention that neopentasilane can be prepared as the primary process product (in addition to $SiX_4$) in significantly higher yields and in significantly higher purity than by other prior art processes. Very particular preference is given to using a mixture of octachlorotrisilane and decachlorotetrasilane for the process according to the invention, the proportion of octachlorotrisilane generally being at least 20% by weight, preferably at least 80% by weight, based on the mixture.

The proportion of the at least one halosilane in the reaction mixture used in the process is preferably at least 60%, preferably at least 80%, by weight, based on the total mass of the reaction mixture. The reaction mixture most preferably comprises only the at least one catalyst and the halosilane(s).

The catalyst usable in the process according to the invention is a catalyst of the generic formula $NRR'_aR''_bY_c$ where a=0 or 1, b=0 or 1, and c=0 or 1, and

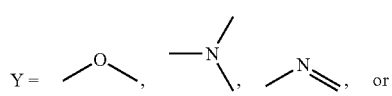

-continued

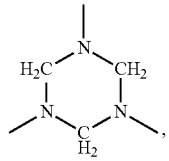

where R, R' and R'' may each independently be different mono- or divalent radicals which are substituents of the nitrogen atom N, or may form an (optionally bi- or tri-)cyclic structure with the nitrogen atom—optionally with incorporation of a Y group if present.

In the case that c=0 and a and b=1, the generic formula of the catalyst describes a preferred group of catalysts which may be tertiary (optionally cyclic, bicyclic or tricyclic) amines or nitrogen-containing heteroaromatics.

In the case that a=b=1 and c=0, the catalyst in this case is more preferably a tertiary amine, i.e. a catalyst of the generic formula $NRR'R''$ in which R, R' and R'' are each -Ph, -PhCH$_3$, -PhC$_2$H$_5$, -PhC$_3$H$_7$, —CH$_2$(C$_6$H$_4$)CH$_3$, —CH$_2$(C$_6$H$_4$)C$_2$H$_5$, —C$_2$H$_4$(C$_6$H$_4$)C$_2$H$_5$, —C$_2$H$_4$(C$_6$H$_4$)C$_3$H$_7$, —C$_3$H$_6$(C$_6$H$_4$)—C$_3$H$_7$, —C$_6$H$_2$(CH$_3$)$_3$, —C$_6$H$_3$(CH$_3$)$_2$, —C$_8$H$_7$, —C$_8$H$_6$CH$_3$, -PhNR'''R'''', -PhCH$_2$NR'''R'''', -PhC$_2$H$_4$NR'''R'''', -PhC$_3$H$_6$NR'''R'''', —CH$_2$(C$_6$H$_4$)CH$_2$NR'''R'''', —CH$_2$(C$_6$H$_4$)C$_2$H$_4$NR'''R'''', —C$_2$H$_4$(C$_6$H$_4$)—C$_2$H$_4$NR'''R'''', —C$_2$H$_4$(C$_6$H$_4$)C$_3$H$_6$NR'''R'''', —C$_3$H$_6$(C$_6$H$_4$)C$_3$H$_6$NR'''R'''', —CH$_2$NR'''R'''', —C$_2$H$_4$NR'''R'''', —C$_3$H$_6$NR'''R'''', —C$_4$H$_8$NR'''R'''', —C$_5$H$_{10}$NR'''R'''', —C$_6$H$_{12}$NR'''R'''', —C$_7$H$_{14}$NR'''R'''', —C$_8$H$_{16}$NR'''R'''', —C$_9$H$_{18}$NR'''R'''' and/or —C$_{10}$H$_{20}$NR'''R'''' (where R''' and R''''=—C$_1$-C$_{10}$-alkyl, —C$_1$-C$_{10}$-aryl and/or —C$_1$-C$_{10}$-aralkyl), with the proviso that at least one R, R' or R'' radical is not —CH$_3$.

In the case that c=0 and a=1 and b=0 or 1, two or three R, R' and R'' radicals may preferably together form a cyclic or bicyclic, heteroaliphatic or heteroaromatic system including N. The resulting catalysts are preferably cyclic or bicyclic, heteroaliphatic or heteroaromatic ring systems, preferably pyrrolidine, pyrrole, piperidine, pyridine, hexamethyleneimine, azatropylidene or quinoline.

Preferably (in the case that a=b=c=0), R may also be =C—R''' (where R'''=—C$_1$-C$_{10}$-alkyl, —C$_1$-C$_{10}$-aryl and/or —C$_1$-C$_{10}$-aralkyl). Corresponding catalysts are alkyl nitriles.

In the case that c=1, the generic formula NRR'$_a$R''$_b$Y$_c$ describes different catalysts having at least one further heteroatom and having cyclic or bi-(optionally poly-)cyclic structure.

Preferred monocyclic structures, for example triazoles, oxazines or piperazines, result in the case that

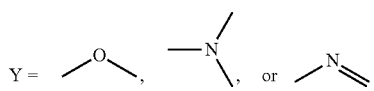

and two or three corresponding R, R' and R'' radicals are selected from the group consisting of —C$_1$-C$_{12}$-alkylene, —C$_1$-C$_{12}$-arylene, —C$_1$-C$_{12}$-aralkylene, —C$_1$-C$_{12}$-heteroalkylene, —C$_1$-C$_{12}$-heteroarylene and —C$_1$-C$_{12}$-heteroaralkylene radicals and/or —N= (preferably —CH$_2$—, —C$_2$H$_4$—, —C$_3$H$_6$—, —C$_4$H$_8$—, —C$_5$H$_{10}$—, —C$_6$H$_{12}$—, —C$_7$H$_{14}$—, —C$_8$H$_{16}$—, —C$_9$H$_{18}$—, —C$_{10}$H$_{20}$—, -Ph-, -PhCH$_2$—, -PhC$_2$H$_4$—, -PhC$_3$H$_6$—, —CH$_2$(C$_6$H$_4$)CH$_2$—, —CH$_2$(C$_6$H$_4$)C$_2$H$_4$—, —C$_2$H$_4$(C$_6$H$_4$)C$_2$H$_4$—, —C$_2$H$_4$(C$_6$H$_4$)C$_3$H$_6$—, —C$_3$H$_6$(C$_6$H$_4$)C$_3$H$_6$—, —C$_6$H(CH$_3$)$_3$—, —C$_6$H$_2$(CH$_3$)$_2$—, —CH=, —CH=CH—, —N=, —N=CH— and/or —CH=N—). Any R, R' or R'' radical not involved in the ring formation is then selected from the group consisting of —C$_1$-C$_{12}$-alkyl, —C$_1$-C$_{12}$-aryl, —C$_1$-C$_{12}$-aralkyl, —C$_1$-C$_{12}$-aminoalkyl, —C$_1$-C$_{12}$-aminoaryl, —C$_1$-C$_{12}$-aminoaralkyl, preferably -Ph, -PhCH$_3$, -PhC$_2$H$_5$, -PhC$_3$H$_7$, —CH$_2$(C$_6$H$_4$)CH$_3$, —CH$_2$(C$_6$H$_4$)C$_2$H$_5$, —C$_2$H$_4$(C$_6$H$_4$)C$_2$H$_5$, —C$_2$H$_4$(C$_6$H$_4$)C$_3$H$_7$, —C$_3$H$_6$(C$_6$H$_4$)—C$_3$H$_7$, —C$_6$H$_2$(CH$_3$)$_3$, —C$_6$H$_3$(CH$_3$)$_2$, —C$_8$H$_7$, —C$_8$H$_6$CH$_3$, -PhNR'''R'''', -PhCH$_2$NR'''R'''', -PhC$_2$H$_4$NR'''R'''', -PhC$_3$H$_6$NR'''R'''', —CH$_2$(C$_6$H$_4$)CH$_2$NR'''R'''', —CH$_2$(C$_6$H$_4$)C$_2$H$_4$NR'''R'''', —C$_2$H$_4$(C$_6$H$_4$)C$_2$H$_4$NR'''R'''', —C$_2$H$_4$(C$_6$H$_4$)C$_3$H$_6$NR'''R'''', —C$_3$H$_6$(C$_6$H$_4$)C$_3$H$_6$NR'''R'''', —CH$_2$NR'''R'''', —C$_2$H$_4$NR'''R'''', —C$_3$H$_6$NR'''R'''', —C$_4$H$_8$NR'''R'''', —C$_6$H$_{10}$NR'''R'''', —C$_6$H$_{12}$NR'''R'''', —C$_7$H$_{14}$NR'''R'''', —C$_8$H$_{16}$NR'''R'''', —C$_9$H$_{18}$NR'''R'''' and/or —C$_{10}$H$_{20}$NR'''R'''' (where R''' and R''''=—C$_1$-C$_{10}$-alkyl, —C$_1$-C$_{10}$-aryl and/or —C$_1$-C$_{10}$-aralkyl).

The catalyst of the generic formula NRR'$_a$R''$_b$Y$_c$ where c=1 is most preferably a bi- or polycyclic amine compound. Bi- or polycyclic amine compounds are the result in the case that

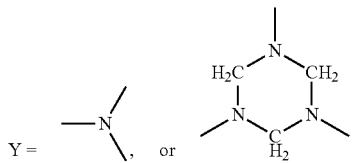

and a corresponding selection of the R, R' and R'' radicals is made from the group consisting of —C$_1$-C$_{12}$-alkylene, —C$_1$-C$_{12}$-arylene, —C$_1$-C$_{12}$-aralkylene, —C$_1$-C$_{12}$-heteroalkylene, —C$_1$-C$_{12}$-heteroarylene and —C$_1$-C$_{12}$-heteroaralkylene radicals and/or —N=. The R, R' and R'' radicals are further preferably selected from the group consisting of —CH$_2$—, —C$_2$H$_4$—, —C$_3$H$_6$—, —C$_4$H$_8$—, —C$_5$H$_{10}$—, —C$_6$H$_{12}$—, —C$_7$H$_{14}$—, —C$_8$H$_{16}$—, —C$_9$H$_{18}$—, —C$_{10}$H$_{20}$—, -Ph-, -PhCH$_2$—, -PhC$_2$H$_4$—, -PhC$_3$H$_6$—, —CH$_2$(C$_6$H$_4$)CH$_2$—, —CH$_2$(C$_6$H$_4$)C$_2$H$_4$—, —C$_2$H$_4$(C$_6$H$_4$)C$_2$H$_4$—, —C$_2$H$_4$(C$_6$H$_4$)C$_3$H$_6$—, —C$_3$H$_6$(C$_6$H$_4$)C$_3$H$_6$—, —C$_6$H(CH$_3$)$_3$—, —C$_6$H$_2$(CH$_3$)$_2$—, —CH=, —CH=CH—, —N=, —N=CH— and/or —CH=N—. Very particularly preferred catalysts are azabicycloalkanes and piperazines, especially diazabicyclooctane and N,N-1,4-dimethylpiperazine.

The best results can be achieved when the catalysts used in the process according to the invention are selected from the group of compounds consisting of cyclic, bicyclic and polycyclic amines with or without further heteroatoms.

Even further preferably, the catalyst used may be diazabicyclooctane, pyridine and N,N-1,4-dimethylpiperazine. These catalysts are particularly suitable for catalysing the conversion of octahalotrisilanes, decahalotetrasilanes or mixtures thereof to the corresponding tetrakis(trihalosilyl)silanes (Si(SiX$_3$)$_4$).

The present invention thus likewise provides a process for preparing neopentasilane, in which
a) i) at least one octahalotrisilane of the generic formula Si$_3$X$_8$ where X=F, Cl, Br and/or I, decahalotetrasilane of the generic formula Si$_4$X$_{10}$ where X=F, Cl, Br and/or I, or a mixture thereof is converted with
ii) at least one catalyst selected from the group consisting of diazabicyclooctane, pyridine and N,N-1,4-dimethylpiperazine
to form a mixture comprising at least one halosilane of the generic formula Si$_5$X$_{12}$ (where X=F, Cl, Br and/or I) and SiX$_4$ (where X=F, Cl, Br and/or I),
b) the at least one halosilane of the generic formula Si$_5$X$_{12}$ is hydrogenated to form neopentasilane of the generic formula Si$_5$H$_{12}$,
c) the neopentasilane of the generic formula Si$_5$H$_{12}$ is separated from partially halogenated hydridosilanes of the general formula Si$_5$H$_{12-y}$X$_y$ (where 1<y<11), and
d) optionally, the partially halogenated hydridosilanes of the general formula Si$_5$H$_{12-1}$X$_y$ (where 1<y<11) separated in step c) are hydrogenated again.

The proportion of the at least one catalyst, based on the amount of chlorosilane used, in the process according to the invention for preparing hydridosilanes, especially neopentasilane, is preferably in the range from 0.001 to 1% by weight.

The catalyst can be used in the form of a pure substance or in the form of a slurry in a solvent, for example diethyl ether, preferably in proportions of the catalyst of 1-25% by weight based on the total mass of the slurry.

The reaction can be effected in the presence or absence of a solvent. The process according to the invention is preferably performed without solvents. When it is, though, performed in the presence of a solvent, preferred solvents used may be solvents selected from the group consisting of linear, branched and cyclic, saturated, unsaturated and aromatic hydrocarbons having one to 18 carbon atoms (optionally partially or fully halogenated), ethers, ketones and esters. Particular preference is given to n-pentane, n-hexane, n-heptane, n-octane, n-decane, dodecane, tetradecane, hexadecane, cyclohexane, cyclooctane, cyclodecane, dicyclopentane, benzene, toluene, m-xylene, p-xylene, mesitylene, tetrahydronaphthalene, decahydronaphthalene, diethyl ether, dipropyl ether, ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, tetrahydrofuran, acetone, p-dioxane, acetonitrile, dimethylformamide, dimethyl sulfoxide, dichloromethane and chloroform. Solvents usable particularly efficiently are the hydrocarbons n-pentane, n-hexane, n-hexane, n-octane, n-decane, dodecane, cyclohexane, cyclooctane, cyclodecane, benzene, toluene, m-xylene, p-xylene, mesitylene. The solvent may make up 0.01 to 90% by weight of the total mass.

The catalyst-supported conversion of the halosilane of the generic formula Si$_n$X$_{2n+2}$ is effected preferably at temperatures of −78 to 300° C. and pressures of 1 mbar to 5 bar. Particular preference is given to effecting the catalyst-supported conversion of the halosilane at 10-50° C. and 900 to 1100 mbar.

After the formation of the mixture containing at least one halosilane of the generic formula Si$_m$X$_{2m+2}$ (where m>n and X=F, Cl, Br and/or I) and SiX$_4$, this mixture can in principle be used for the subsequent hydrogenation without further purification.

Preference is given, however, to removing the tetrahalosilane formed from the halosilane of the generic formula Si$_m$X$_{2m+2}$ formed before the hydrogenation. This is further preferably effected by means of distillative removal or drawing off SiX$_4$ at temperatures of −30 to +100° C. and pressures of 0.01 to 1100 mbar, preferably at temperatures of +30 to +60° C. and pressures of 0.02 to 1.0 mbar.

The at least one halosilane of the generic formula Si$_m$X$_{2m+2}$ is hydrogenated in steps b) and d) to form a hydridosilane of the generic formula $Si_mH_{2m+2}$. This is preferably effected using at least one hydrogenating agent selected from the group of the metal hydrides of a metal of main groups 1 to 3 (especially alkali metal or alkaline earth metal hydrides) or the group of hydridic compounds consisting of $LiAlH_4$, $NaBH_4$, $iBu_2AlH$. The hydrogenating agent is more preferably $iBu_2AlH$.

Hydridosilanes preparable by the process according to the invention are also understood to mean compounds which contain essentially only silicon and hydrogen atoms. These hydridosilanes may be gaseous, liquid or solid and are—in the case of solids—essentially soluble in solvents such as toluene or cyclohexane, or in liquid silanes such as cyclopentasilane. Examples include disilane, trisilane, cyclopentasilane and neopentasilane. These hydridosilanes too may have a linear or branched structure with Si—H bonds. The process according to the invention is particularly suitable for preparing branched hydridosilanes. More particularly, it is especially suitable given selection of suitable reactants for preparation of neopentasilane.

In step b), the hydrogenating agent is used to achieve particularly good results in H-equivalent proportions of 1.0-1.5, preferably 1.05-1.2, based on the halogen atoms of the halosilane which are to be hydrogenated.

In step d), a relatively small proportion of hydrogenating agent can be used to achieve complete hydrogenation. In step d), preference is given to using an H-equivalent proportion of 0.05-0.5, more preferably 0.1-0.3, based on the halogen atoms of the halosilane which were originally to be hydrogenated in step b).

The hydrogenation can also be effected in the presence or absence of a solvent. Preference is given to performing the hydrogenation in the presence of a solvent. Solvents useable with preference may be selected from the group consisting of linear, branched and cyclic, saturated, unsaturated and aromatic hydrocarbons having one to 18 carbon atoms and ethers. Particular preference is given to n-pentane, n-hexane, n-heptane, n-octane, n-decane, dodecane, cyclohexane, cyclooctane, cyclodecane, dicyclopentane, benzene, toluene, m-xylene, p-xylene, mesitylene, tetrahydronaphthalene, decahydronaphthalene, diethyl ether, dipropyl ether, ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, tetrahydrofuran, p-dioxane, acetonitrile. Particularly efficiently useable solvents are the hydrocarbons n-pentane, n-hexane, n-hexane, n-octane, n-decane, dodecane, tetradecane, hexadecane, cyclohexane, cyclooctane, cyclodecane, benzene, toluene, m-xylene, p-xylene, mesitylene. In a particularly preferred variant, if the hydrogenating agent used is i-$Bu_2Alh$, the liquid i-$Bu_2AlCl$ arising in the hydrogenation can serve as solvent. The solvent may make up 0.01 to 90% by weight of the total mass.

The halosilane of the generic formula $Si_mX_{2m+2}$ is preferably hydrogenated at temperatures of −78 to 300° C. and pressures of 500 mbar to 5 bar. Particular preference is given to effecting the hydrogenation at −10-30° C. and 900 to 1100 mbar.

The separation required after the end of step b), namely the separation of the hydridosilanes and of the partially halogenated hydridosilanes that are then present (step c)), may in principle take place in any desired way. Preferably, on account of the lower thermal load on the mixture and hence reduced decomposition, further reaction or follow-on reaction, the separation is implemented in an evaporator with short residence times and low evaporation pressure. For this purpose it is possible to use thin-film evaporators or else short-path evaporators, also called molecular distillation. Typical process pressures in these cases are <5 mbar. The product temperature in the evaporator ought not to be >100° C., in order to prevent product decomposition. The distillate obtained as a result of this process is subsequently purified further in a rectifying operation. The liquid-phase product can be recycled as a solvent for the reaction. The low boilers produced in this operation, which are captured in cold traps, are either made use of as a product of value or, depending on the chloride content, are discarded. Further purification of the distillate obtained in the evaporation takes place in a rectifying column. Here it is possible to implement a continuous or batchwise procedure. Rectification takes place in a temperature range between 50 and 100° C. in the liquid-phase or still of the rectifying apparatus. The temperature, however, can also be raised to up to 150° C. The rectifying pressure which comes about under these conditions is situated in a range of 1-100 mbar. In the case of a batch rectification, the products of value are taken off in fractions. In the case of a continuous work-up, at least two columns are required, with the product of value being taken off as distillate in the second column.

In this case, the fully reacted hydrogenating agent, which is the principal product, remains in the liquid phase, and the partially halogenated hydridosilanes are obtained in concentrated form in the distillate.

After the end of step d), the reaction mixture, after the second hydrogenation that has taken place, is purified, preferably by distillation.

In order to obtain particularly pure products, the distillative purification may be followed by a fine purification. The fine purification may take place, for example, by suitable adsorptive or chromatographic methods.

The invention likewise provides the hydridosilanes preparable by the process.

The invention further provides for the use of the hydridosilanes preparable by the process according to the invention for producing electronic or optoelectric component layers, especially for photovoltaic applications or in transistors.

The invention likewise provides for the use of the hydridosilanes preparable by the process according to the invention for producing silicon-containing layers, preferably elemental silicon layers.

The examples which follow are intended to further illustrate the subject-matter of the invention, without themselves having a restrictive effect.

EXAMPLES

Example 1

Synthesis of Higher Hydridosilanes from Halosilanes and Condensation of the Hydridosilanes (H-Equivalent Proportion of the Hydrogenating Agent: 1.2)

In the first step, at 20° C. and 1 bar under an inert gas atmosphere, 304 g of liquid perchlorosilane mixture (>75% by weight $Si_3Cl_8$, >22% by weight $Si_4Cl_{10}$) in a reaction vessel are admixed with stirring with 46.7 g of hexane and 0.9 g of diazabicyclo[2.2.2]-octane, in solution in 7.1 g of diethyl ether. The reactor contents are conditioned by ice cooling to temperatures of less than 20° C. The mixture reacts over the course of 40 hours to give the solid $Si_5Cl_{12}$ and the by-product $SiCl_4$.

After the reaction step, the low boilers (hexane, diethyl ether) and the by-product SiCl$_4$ are separated from the reaction mixture under reduced pressure (200 to 1 mbar) at 50° C. This gives 243.2 g of Si$_5$Cl$_{12}$.

42.7 g of the Si$_5$Cl$_{12}$ obtained are dispersed under an inert gas atmosphere in 20.0 g of diisobutylaluminium chloride. Thereafter 149 g of the hydrogenating agent diisobutylaluminium hydride are added successively with stirring. On account of the exothermic nature of the reaction, the reactor is conditioned by ice cooling during the hydrogenation, and so a temperature of 20° C. in the reactor is not exceeded. The reaction mixture is stirred with ice cooling for a further 18 hours.

Thereafter, at 20° C. under atmospheric pressure (1.013 bar) and under an inert gas atmosphere, volatile constituents such as, for example, SiH$_4$ are removed from the reaction mixture. In the next step, the hydridosilanes are separated by evaporation at 20° C. under reduced pressure (pressure <1 mbar) from the dispersion medium diisobutylaluminium chloride and from unreacted diisobutylaluminium hydride. The condensate contains the hydridosilanes.

The hydridosilanes in the condensate were determined qualitatively by means of GC-MS analysis. The condensate contains hydridosilanes with a proportion of >98.0 area %.

Weight-based yield (g of hydridosilanes as condensate per g of perchlorosilane mixture used): 20.8% (11.1 g hydridosilanes/53.4 g perchlorosilane mixture)

Chloride content of the hydridosilane obtained as distillate: 470 ppm chloride.

Example 2

Synthesis of Higher Hydridosilanes from Halosilanes and Thermal Purification Thereof (H-Equivalent Proportion of the Hydrogenating Agent: 1.1)

In the first step, at 20° C. and 1 bar under an inert gas atmosphere, 1567 g of liquid perchlorosilane mixture (>75% by weight Si$_3$Cl$_8$, >22% by weight Si$_4$Cl$_{10}$) in a reaction vessel are admixed with stirring with 225.7 g of hexane and 1.85 g of diazabicyclo[2.2.2]octane, in solution in 14.2 g of diethyl ether. The reactor contents are conditioned by ice cooling to temperatures of less than 20° C. The mixture reacts over the course of 40 hours to give the solid Si$_5$Cl$_{12}$ and the by-product SiCl$_4$. After the reaction step, the mixture, containing primarily Si$_5$Cl$_{12}$, is admixed with 1015 g of diisobutylaluminium chloride as dispersion medium. Subsequently, the low boilers (hexane, diethyl ether) and the by-product SiCl$_4$ are separated under reduced pressure (200 to 1 mbar) at 50° C.

The Si$_5$Cl$_{12}$ in dispersion in diisobutylaluminium chloride is admixed successively, with stirring, with 4137 g of the hydrogenating agent diisobutylaluminium hydride, under an inert atmosphere. On account of the exothermic nature of the reaction, the reactor is conditioned by ice cooling during the hydrogenation, and so a temperature of 20° C. in the reactor is not exceeded. The reaction mixture is stirred with ice cooling for a further 18 hours.

Thereafter, at 20° C. under atmospheric pressure (1.013 bar) and under an inert gas atmosphere, volatile constituents such as, for example, SiH$_4$ are removed from the reaction mixture. In a short-path evaporator, under reduced pressure (pressure <1 mbar) at 72° C., diisobutylaluminium chloride and unreacted diisobutylaluminium hydride are separated as liquid-phase product. The top product (distillate) from the short-path evaporator is purified further in a rectifying step, using a batch rectification at pressures between 10 and 100 mbar and at a temperature in the evaporator still of 95° C. The hydridosilane is taken from the batch rectification as a distillate.

The hydridosilanes in the distillate were determined qualitatively by means of GC-MS analysis. The distillate contains hydridosilanes with a proportion of >99.0 area %.

Weight-based yield (g of hydridosilanes as distillate per g of perchlorosilane mixture used): 14.6% (228 g hydridosilanes/1567 g perchlorosilane mixture)

Chloride content of the hydridosilane obtained as distillate: 41 ppm chloride.

Example 3

Post-Hydrogenation of Higher Hydridosilanes for Reducing the Chloride Content, and Thermal Purification Thereof Distillate fractions from Example 2 with relatively high chloride levels were combined, and the chloride content of this mixture was ascertained. This hydridosilane mixture is used as reactant in the experiment described here.

185 g of hydridosilane mixture (hydridosilanes >99.0 area %) having a chloride content of 457 ppm are admixed successively, with stirring, with 84 g of diisobutylaluminium hydride under an inert gas atmosphere. Owing to the exothermic nature of the reaction, the reactor is conditioned by ice cooling during the hydrogenation, and so a temperature of 20° C. in the reactor is not exceeded. The reaction mixture is stirred with ice cooling for a further 18 hours.

Following the hydrogenation, at 20° C. and under atmospheric pressure (1.013 bar), volatile constituents such as, for example, SiH$_4$ are removed from the reaction mixture. The reaction product is worked up further in a rectifying step, using a batch rectification at pressures between 10 and 100 mbar and at a temperature in the evaporator still of 95° C. The distillate contains the desired hydridosilane.

Weight-based yield (g of hydridosilanes as distillate per g of hydridosilane mixture used): 87.3% (161.5 g hydridosilanes as distillate/185 g hydridosilane mixture).

Chloride content of the hydridosilane obtained as distillate: 16 ppm chloride.

The hydridosilanes in the distillate were determined qualitatively by means of GC-MS analysis. The distillate contains hydridosilanes with a proportion of >99.0 area %.

The invention claimed is:

1. A process for preparing a hydridosilane, the process comprising:
   a) reacting at least one halosilane of formula: Si$_n$X$_{2n+2}$ in the presence of at least one catalyst of formula: NRR'$_a$R''$_b$Y$_c$ to form a mixture comprising at least one halosilane of formula Si$_m$X$_{2m+2}$;
   b) hydrogenating the at least one halosilane of formula: Si$_m$X$_{2m+2}$ to form a hydridosilane of formula Si$_m$H$_{2m+2}$;
   c) separating the hydridosilane of formula: Si$_m$X$_{2m+2}$ from partially halogenated hydridosilanes of formula: Si$_m$H$_{(2m+2-y)}$X$_y$; and
   d) optionally, hydrogenating the partially halogenated hydridosilanes of formula:

to form at least one hydridosilane,
   wherein:
   n is greater than or equal to 3;
   X independently represents F, Cl, Br, I, or a mixture thereof;

a represents 0 or 1;
b represents 0 or 1;
c represents 0 or 1;
Y represents

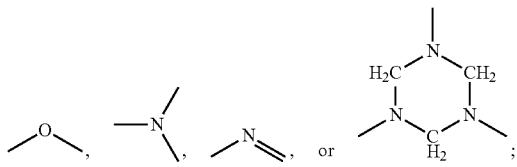

R, R' and/or R" independently represent —$C_1$-$C_{12}$-alkyl, —$C_1$-$C_{12}$-aryl, —$C_1$-$C_{12}$-aralkyl, —$C_1$-$C_{12}$-aminoalkyl, —$C_1$-$C_{12}$-aminoaryl, —$C_1$-$C_{12}$-aminoaralkyl, and/or when c=0, two or three of R, R' and R" together form a cyclic or bicyclic, heteroaliphatic or heteroaromatic system including N, with the proviso that at least one R, R' or R" radical is not —$CH_3$, and/or when c=1, R and R' and/or R" are each —$C_1$-$C_{12}$-alkylene, —$C_1$-$C_{12}$-arylene, —$C_1$-$C_{12}$-aralkylene, —$C_1$-$C_{12}$-heteroalkylene, —$C_1$-$C_{12}$-heteroarylene, —$C_1$-$C_{12}$-heteroaralkylene and/or —N=, or when a=b=c=0, R'";

R'" represents —$C_1$-$C_{10}$-alkyl, —$C_1$-$C_{10}$-aryl and/or —$C_1$-$C_{10}$-aralkyl;

m is greater than n; and 1<y<2 m+1).

2. The process according to claim 1, wherein the halosilane of the generic formula $Si_nX_{2n+2}$ is a linear silane.

3. The process according to claim 1, wherein the at least one halosilane is $Si_3X_8$, $Si_4X_{10}$, or both.

4. The process according to claim 1, wherein the catalyst is selected from the group consisting of a cyclic amine, a bicyclic amine and a polycyclic amine, with or without further heteroatoms.

5. The process according to claim 4, wherein the catalyst is diazabicyclooctane, pyridine or N,N-1,4-dimethylpiperazine.

6. The process according to claim 1, wherein the hydrogenating b) is preceded by removal of the at least one halosilane of formula $Si_mX_{2m+2}$ from $SiX_4$ by distillative removal or by drawing off $SiX_4$ at temperatures of −30 to +100° C. and pressures of 0.01 to 1100 mbar.

7. The process according to claim 1, wherein the hydrogenating b) occurs by adding at least one hydrogenating agent selected from the group consisting of a metal hydride of a metal of main groups 1 to 3, $LiAlH_4$, $NaBH_4$, and $iBu_2AlH$.

8. The process according to claim 1, wherein the hydrogenating b) and the optional hydrogenating d) occur in the presence of a solvent.

9. The process according to claim 1, comprising hydrogenating d) the partially halogenated hydridosilanes of formula: $Si_m H_{(2m+2-y)}X_y$.

10. The process according to claim 2 wherein the at least one halosilane is $Si_3X_8$, $Si_4X_{10}$, or both.

* * * * *